United States Patent
Yagi

(10) Patent No.: US 9,473,884 B2
(45) Date of Patent: Oct. 18, 2016

(54) MANAGEMENT APPARATUS, MOBILE APPARATUS, AND MANAGEMENT SYSTEM

(71) Applicant: FUJITSU LIMITED, Kawasaki-shi, Kanagawa (JP)

(72) Inventor: Kentaro Yagi, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/741,779

(22) Filed: Jun. 17, 2015

(65) Prior Publication Data

US 2016/0044452 A1 Feb. 11, 2016

(30) Foreign Application Priority Data

Aug. 6, 2014 (JP) .................................. 2014-160666

(51) Int. Cl.
*H04W 4/02* (2009.01)

(52) U.S. Cl.
CPC ...................... *H04W 4/02* (2013.01)

(58) Field of Classification Search
CPC ........................................................ H04W 4/02
USPC ....................................................... 455/456.1
See application file for complete search history.

(56) References Cited

FOREIGN PATENT DOCUMENTS

| JP | 2001-348110 | 12/2001 |
| JP | 2012-205850 | 10/2012 |

*Primary Examiner* — Qutbuddin Ghulamali
(74) *Attorney, Agent, or Firm* — Staas & Halsey LLP

(57) ABSTRACT

A management apparatus including a memory; and a processor coupled to the memory and configured to: receive identification information of the management target apparatus and positional information of a mobile apparatus from the mobile apparatus installed at a same location as a management target apparatus, and generate management information of the management target apparatus including information identifying an installation site of the management target apparatus based on the received identification information and positional information.

15 Claims, 12 Drawing Sheets

MANAGEMENT APPARATUS, MOBILE APPARATUS, AND MANAGEMENT SYSTEM

CROSS-REFERENCE TO RELATED APPLICATION

This application is based upon and claims the benefit of priority of the prior Japanese Patent Application No. 2014-160666, filed on Aug. 6, 2014, the entire contents of which are incorporated herein by reference.

FIELD

The embodiments discussed herein are related to a management apparatus, a mobile apparatus, and a management system.

BACKGROUND

To date, a maintenance person sometimes visits an installation site of a management target apparatus, and gives a maintenance checkup of the management target apparatus periodically or when a failure has occurred. As related-art techniques, for example, based on an installation detection circuit which detects that an electronic cassette was picked up from a packing box and installed at a customer's site, and transport information, which is a measurement result of a sensor group, such as an acceleration sensor, or the like, a technique for determining whether a failure has occurred or not in an electronic cassette during transport is disclosed. A mobile terminal is often provided with a global positioning system (GPS) reception function or/and a bar-code input function. Then, based on an instruction from a center or a preset condition in the mobile terminal, a technique is provided for the mobile terminal to add GPS information or/and bar-code information, and to transmit the information to the center. As related art, for example, Japanese Laid-open Patent Publication No. 2001-348110 and Japanese Laid-open Patent Publication No. 2012-205850 are disclosed.

However, with the related-art techniques, it may be difficult to grasp an installation site of a management target apparatus. Specifically, for example, if information for identifying an installation site of a management target apparatus is created based on information input by an on-site worker who installed the management target apparatus, the information that identifies the installation site of the management target apparatus might indicate an incorrect place because of an input error or input omission by the on-site worker.

SUMMARY

According to an aspect of the invention, a management apparatus including a memory; and a processor coupled to the memory and configured to: receive identification information of the management target apparatus and positional information of a mobile apparatus from the mobile apparatus installed at a same location as a management target apparatus, and generate management information of the management target apparatus including information identifying an installation site of the management target apparatus based on the received identification information and positional information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a detailed description will be given of a management apparatus, a terminal apparatus, and a management system according to embodiments of the present disclosure with reference to the drawings.

Figure 1:
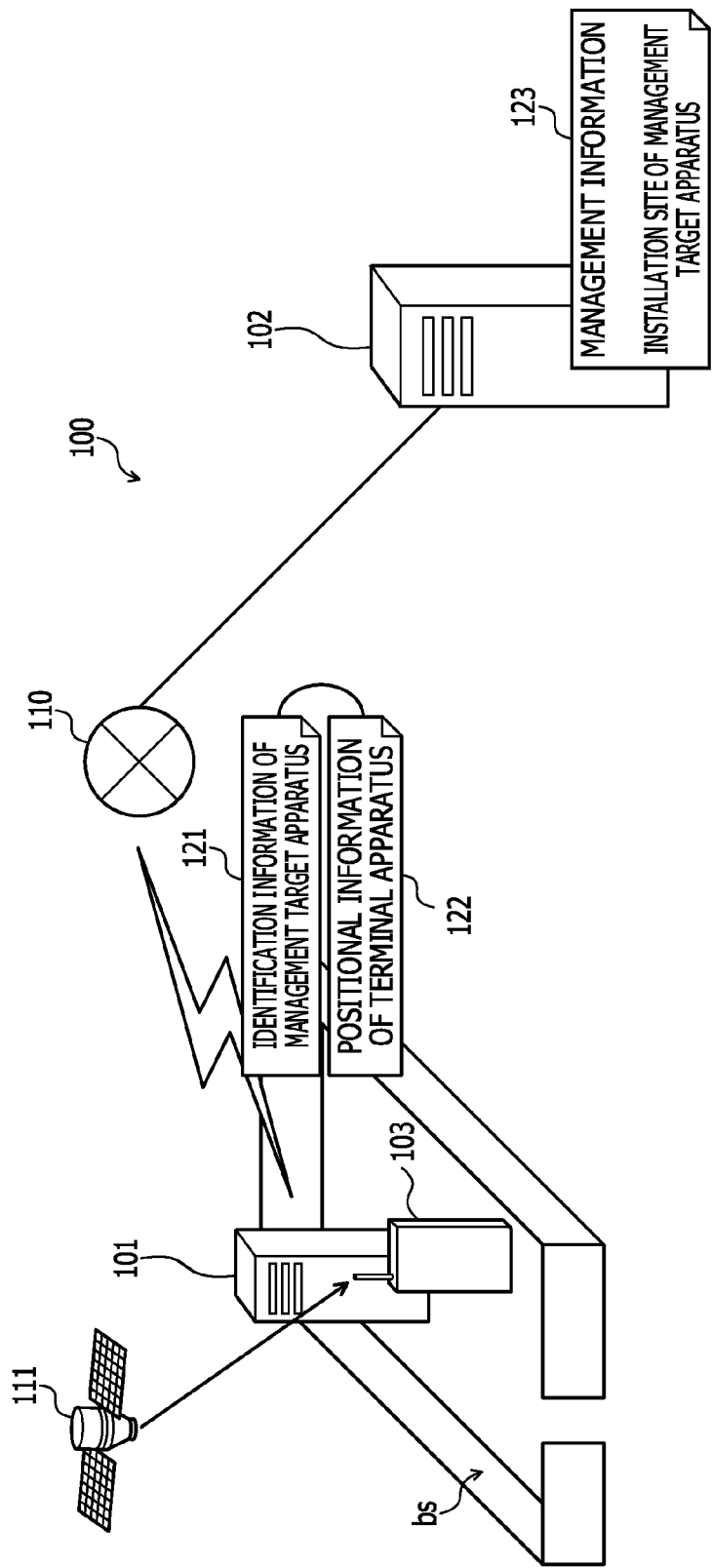
FIG. 1 is an explanatory diagram illustrating an example of operation of a management system according to the present embodiment.

FIG. 1 is an explanatory diagram illustrating an example of operation of a management system 100 according to the present embodiment. The management system 100 is a system that supports maintenance of a management target apparatus 101. Specifically, a maintenance person who belongs to a on-site location of the management target apparatus 101, which was shipped from a manufacturer, visits the location where the management target apparatus 101 was installed when a failure occurs or periodically, and carries out maintenance of the management target apparatus 101 as a maintenance service of the management target apparatus 101. For example, when a failure occurs, the maintenance person directly operate the management target apparatus 101 at the location where the management target apparatus 101 was installed in order to investigate the cause of the failure at the installation location. The maintenance person collects information indicating an operation result of the management target apparatus 101 stored inside the management target apparatus 101, replaces a part of the management target apparatus 101, or updates firmware of the management target apparatus 101 in order to solve a problem found in another place. The management target apparatus 101 may be of any type, for example, a storage device, or the like. The management target apparatus 101 may be one, or may be plural.

For example, a maintenance person performs management and operation of the management target apparatus 101 based on the information identifying an installation site of the management target apparatus 101, or the management information of the management target apparatus 101 including identification information of the management target apparatus 101, which was input by an on-site worker who uses the management target apparatus 101. However, if correct information is not obtained by input omission or an input error by the on-site worker, it becomes difficult to perform maintenance work. For example, if an on-site worker mistakenly inputs an apparatus serial number as the identification information of the management target apparatus 101, a maintenance person who is not familiar with the management target apparatus 101 might visit the location where the management target apparatus 101 is installed, and thus the maintenance cost increases. If an on-site worker mistakenly inputs information identifying the installation site of the management target apparatus 101, a maintenance person finds it difficult to reach the location where the management target apparatus 101 was installed, and the maintenance cost increases.

It is thought that the on-site worker inputs and sends the management information of the management target apparatus 101 by mail, or the like using a mobile terminal having a GPS function in order to obtain correct management information of the management target apparatus 101. However, input omission or an input error might occur in the information input by the on-site worker. If the management target apparatus 101 includes a network interface, it is thought that the management target apparatus 101 transmits management information of the management target apparatus 101. However, there are cases where access to an external network is restricted by security measures of the location where the management target apparatus 101 is installed, and thus the management target apparatus 101 is not allowed to transmit the management information of the management target apparatus 101.

In this manner, if it is not possible to obtain correct information of the management target apparatus 101, it becomes difficult to collect information indicating an operation result of the management target apparatus 101, and the like, or to extract problem information of the management target apparatus 101. This becomes the cause for hampering quality improvement of the management target apparatus 101. If an installation location of the management target apparatus 101 is in a different country from a country of its manufacturer, an on-site worker might fail to correctly understand the contents of the input information of the management target apparatus 101, and thus sometimes it becomes difficult to input correct management information of the management target apparatus 101.

Thus, the management system 100 according to the present embodiment creates information that identifies an installation site of the management target apparatus 101 from the positional information of the terminal apparatus received from a terminal apparatus at the time of unpacking, which has been packed together with the management target apparatus 101. Thereby, it is possible for the management system 100 to create management information of the management target apparatus 101 without input of the installation site by an on-site worker, and thus management information of the management target apparatus 101 including information identifying the installation site becomes correct.

The management system 100 illustrated in FIG. 1 includes a management apparatus 102, and a terminal apparatus 103. The management target apparatus 101 and the terminal apparatus 103 are connected through a network 110. In the example in FIG. 1, the terminal apparatus 103 and the network 110 are connected through wireless communication. The management target apparatus 101 and the network 110 are connected through wired communication.

The management apparatus 102 is a computer that manages the management target apparatus 101. The management apparatus 102 is a server, for example. The management apparatus 102 may be a personal computer, for example. The terminal apparatus 103 is a computer installed at the same location as the management target apparatus 101, capable of obtaining positional information, and storing identification information of the management target apparatus 101. If a plurality of the management target apparatuses 101 are provided, the terminal apparatus 103 stores identification information of all the management target apparatuses 101 for the identification information of the management target apparatuses 101.

Here, for example, the manufacturer of the management target apparatus 101 packs the terminal apparatus 103, and the management target apparatus 101 in the same box, and ships the apparatuses in order to guarantee that the apparatuses are placed at the same location. Then, an on-site worker unpacks the box, and installs the management target apparatus 101 and the terminal apparatus 103 so that it is possible to guarantee that the terminal apparatus 103 and the management target apparatus 101 are placed at the same location. Even if the on-site worker unpacks the box, takes the management target apparatus 101 out of the box, while the terminal apparatus 103 is kept in the box without being taken out of the box at the location, it is possible to guarantee that the terminal apparatus 103 and the management target apparatus 101 are placed at the same location. In the example in FIG. 1, the management target apparatus 101 and the terminal apparatus 103 are placed at a location bs.

For a method of obtaining positional information, for example, the terminal apparatus 103 may include a GPS sensor, and may obtain positional information obtained from the GPS sensor, or may obtain positional information from a base station in the vicinity of the terminal apparatus 103. In the example in FIG. 1, the terminal apparatus 103 obtains positional information of the terminal apparatus 103 through communication with a GPS satellite 111, which is obtained through the GPS sensor.

After obtaining positional information of the terminal apparatus 103, the terminal apparatus 103 transmits identification information 121 of the management target apparatus 101, and positional information 122 of the terminal apparatus 103 in association with each other to the management apparatus 102. The management apparatus 102 receives the identification information 121 of the management target apparatus 101, and the positional information 122 of the terminal apparatus 103. Then, the management apparatus 102 creates management information 123 of the management target apparatus 101 including information identifying an installation site of the management target apparatus 101 based on the positional information 122 of the terminal apparatus 103.

Specifically, for example, the management apparatus 102 regards the positional information 122 of the terminal apparatus 103 as the positional information of the management target apparatus 101, and determines the positional information of the terminal apparatus 103 to be an installation site of the management target apparatus 101. The management apparatus 102 may convert the positional information 122 of the terminal apparatus 103 into a character string representing an address, and determine the converted character string to be an installation site of the management target apparatus 101.

Figure 2:
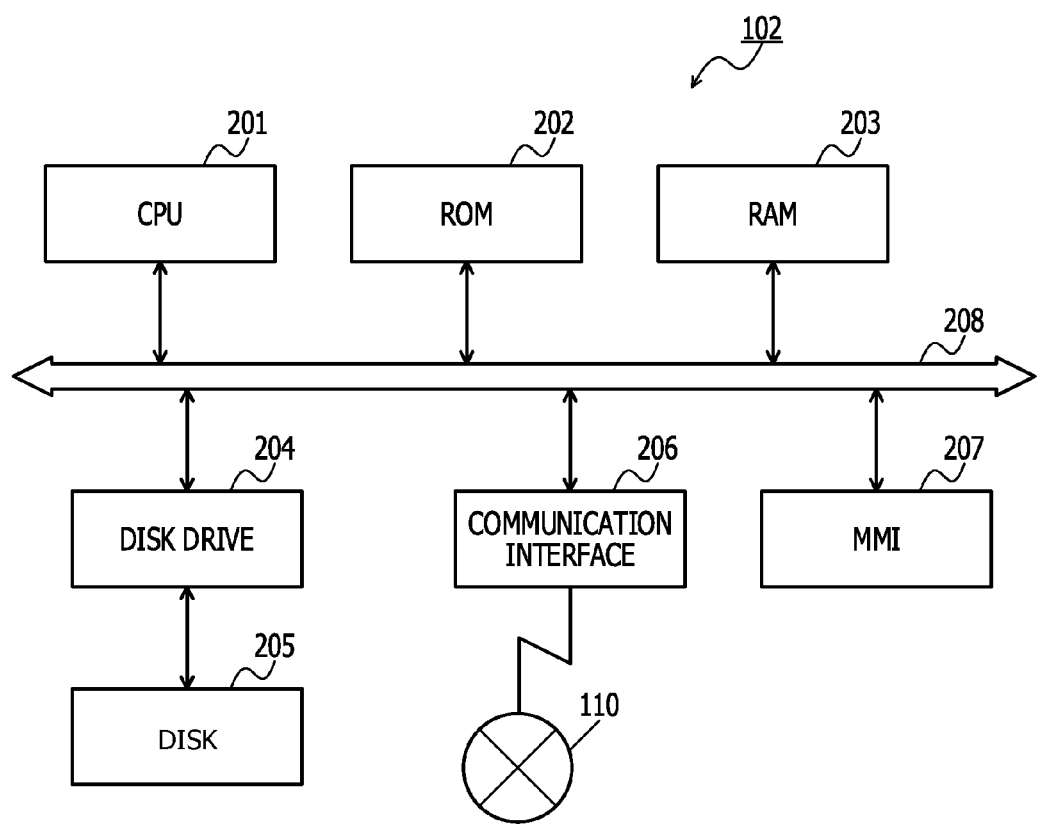
FIG. 2 is a block diagram illustrating an example of a hardware configuration of a management apparatus.
Figure 3:
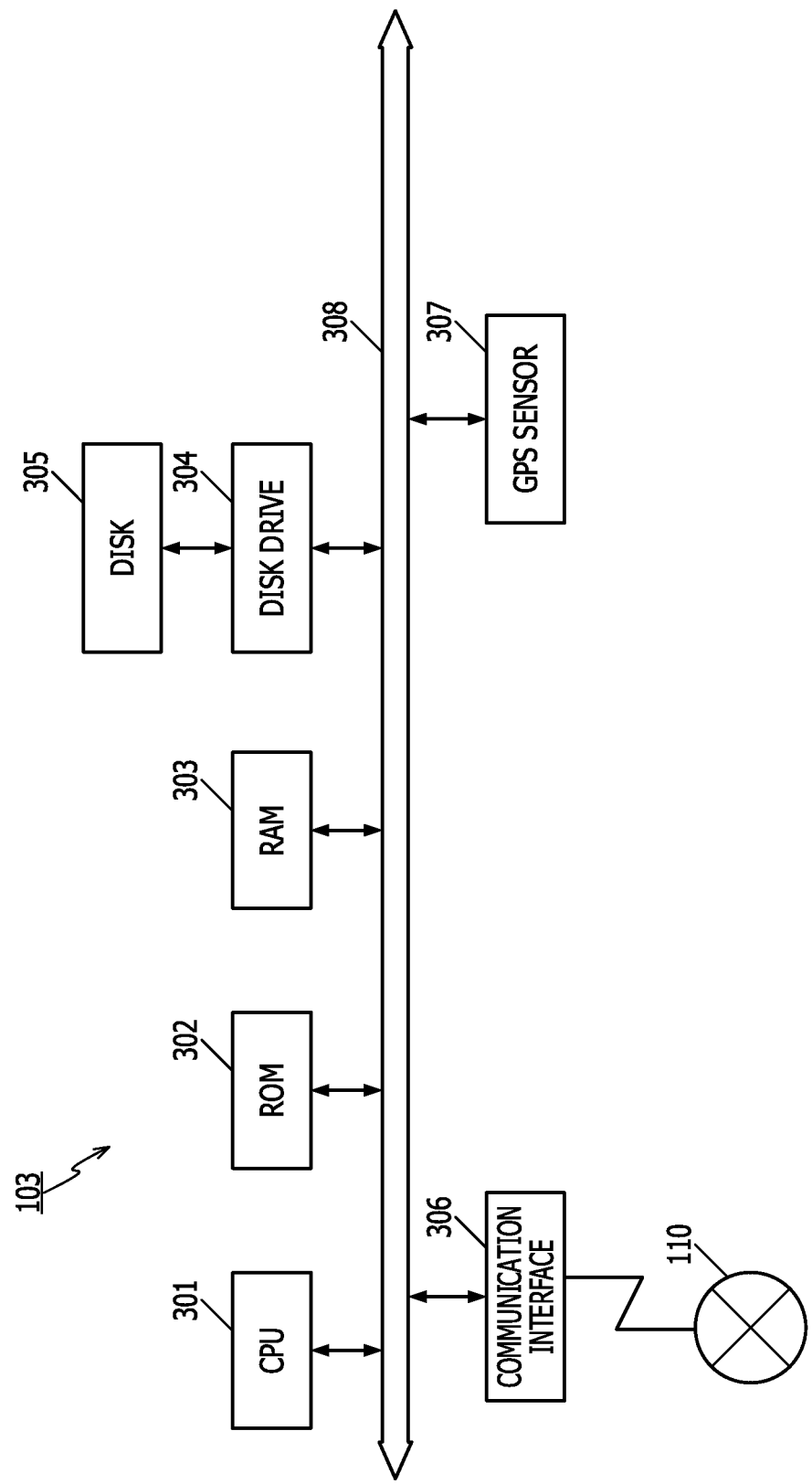
FIG. 3 is a block diagram illustrating an example of a hardware configuration of a terminal apparatus.
Figure 4:
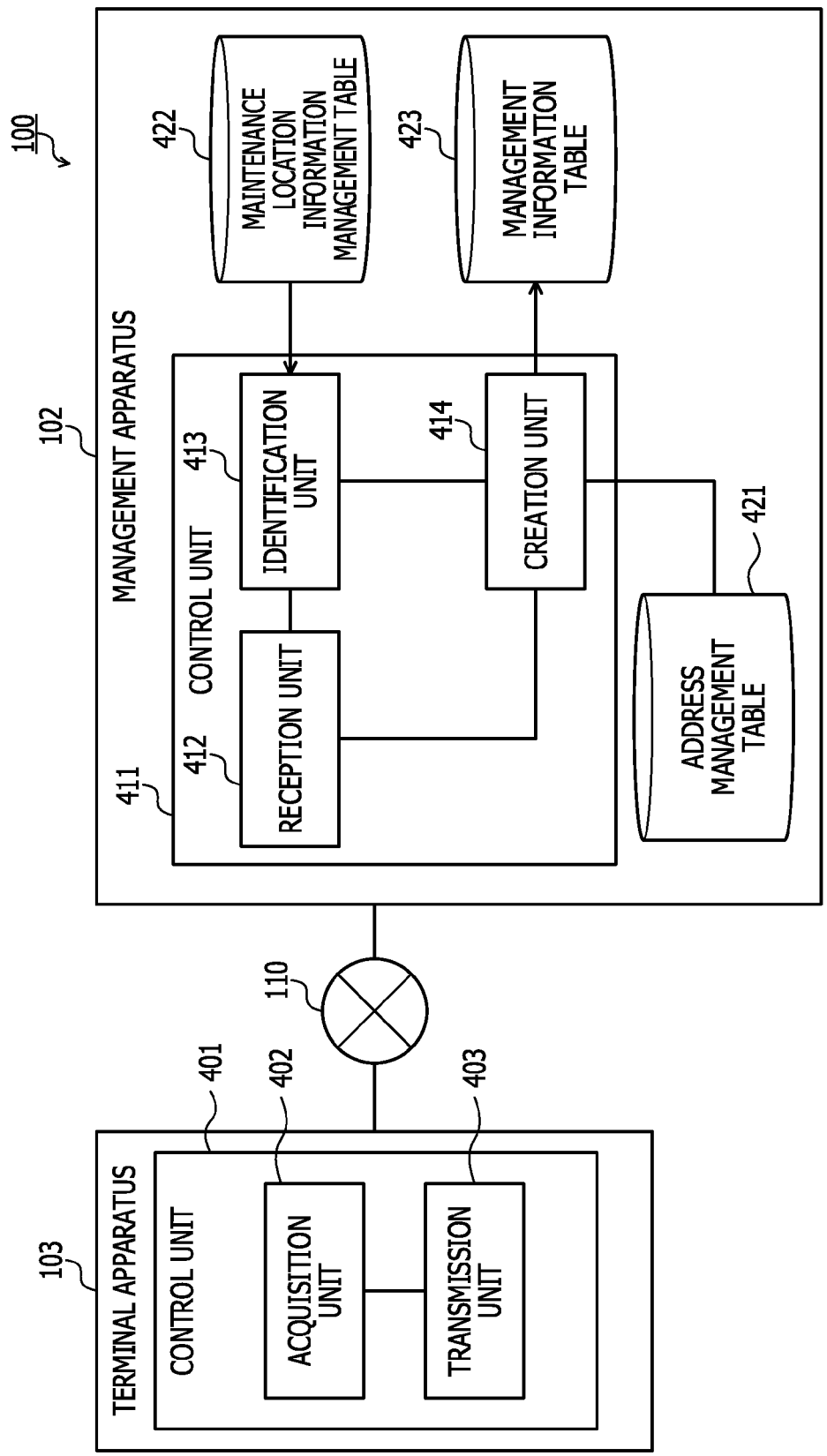
FIG. 4 is a block diagram illustrating an example of a functional configuration of the management system.

Next, an example of a hardware configuration of the management apparatus 102 is illustrated using FIG. 2, an example of a hardware configuration of the terminal apparatus 103 is illustrated using FIG. 3, and an example of a functional configuration of the management system 100 is illustrated using FIG. 4.

FIG. 2 is a block diagram illustrating an example of a hardware configuration of the management apparatus 102. In FIG. 2, the management apparatus 102 includes a central processing unit (CPU) 201, a read only memory (ROM) 202, and a random access memory (RAM) 203. The management apparatus 102 includes a disk drive 204 and a disk 205, a communication interface 206, and a man machine interface (MMI) 207. The CPU 201 to the disk drive 204, the communication interface 206, and the MMI 207 are connected with one another through a bus 208.

The CPU 201 is a processor performing control of the overall management apparatus 102. The ROM 202 is a nonvolatile memory storing a program, such as a boot program, and the like. The RAM 203 is a volatile memory for use as a work area of the CPU 201.

The disk drive 204 is a control unit that controls data read and write on the disk 205 under the control of the CPU 201. For the disk drive 204, it is possible to employ a magnetic disk drive, a solid-state drive, or the like, for example. The disk 205 is a nonvolatile memory that stores data written under the control of the disk drive 204. For example, when the disk drive 204 is a magnetic disk drive, it is possible to use a magnetic disk for the disk 205. When the disk drive 204 is a solid-state drive, it is possible to use a semiconductor memory formed by a semiconductor device, that is to say, a so-called semiconductor disk for the disk 205.

The communication interface 206 is a control unit that manages the internal interface with the network 110, and controls input/output of data from/to another apparatus. Specifically, the communication interface 206 is connected to another apparatus, such as a terminal apparatus 103, or the like through the network 110 via a communication line. It is possible to employ, for example a modem or a LAN adapter, or the like for the communication interface 206. The MMI 207 is an apparatus that mediates a user of the management apparatus 102, and the management apparatus 102.

FIG. 3 is a block diagram illustrating an example of a hardware configuration of the terminal apparatus 103. In FIG. 3, the terminal apparatus 103 includes a CPU 301, a ROM 302, a RAM 303, a disk drive 304 and a disk 305, and a communication interface 306. Further, the terminal apparatus 103 includes a GPS sensor 307. The CPU 301 to the disk drive 304, the communication interface 306, and the GPS sensor 307 are individually connected through a bus 308.

Here, the CPU 301 is a processor performing control of the overall terminal apparatus 103. The ROM 302 is a nonvolatile memory storing a program, such as a boot program, and the like. The RAM 303 is a volatile memory for use as a work area of the CPU 301. The disk drive 304 is a control unit that controls data read and write on the disk 305 under the control of the CPU 301. The disk 305 is a nonvolatile memory that stores data written under the control of the disk drive 304. For the disk drive 304, for example it is possible to employ a solid-state drive, or the like. If the disk drive 304 is a solid-state drive, it is possible to employ a semiconductor memory, or a so-called a semiconductor disk for the disk 305.

The communication interface 306 is a control unit that manages the internal interface with the network 110, and controls input/output of data from/to the other apparatus. Specifically, the communication interface 306 is connected to the network 110 via a communication line, and connected to another computer through the network 110. Then, the communication interface 306 manages the network 110 and the internal interface, and controls input/output of data from/to the other apparatus. The GPS sensor 307 is a sensor that receives a signal from a GPS satellite, and obtains positional information of the terminal apparatus 103. The terminal apparatus 103 illustrated in FIG. 3 is assumed to be a dedicated terminal apparatus, but may be a smart phone, a tablet terminal, or a mobile phone.

FIG. 4 is a block diagram illustrating an example of a functional configuration of the management system 100. The terminal apparatus 103 includes a control unit 401. Then, the control unit 401 includes an acquisition unit 402, and a transmission unit 403. In the control unit 401, the CPU 301 executes the control program stored in the storage device so as to achieve functions of the individual units. The storage device specifically represents the ROM 302, the RAM 303, the disk 305, and the like illustrated in FIG. 3, for example. A processing result of each unit is stored in a register of the CPU 301, or a cache memory of the CPU 301, or the like.

Although not illustrated in FIG. 4, the terminal apparatus 103 includes a storage unit that stores identification information of the management target apparatus 101 installed at the same location as the terminal apparatus 103. The identification information of the management target apparatus 101 is stored in a storage device, such as the disk 305.

The management apparatus 102 includes a control unit 411. Then, the control unit 411 includes a reception unit 412, an identification unit 413, and a creation unit 414. In the control unit 411, the CPU 201 executes a control program stored in the storage device so as to achieve functions of the individual units. The storage device specifically represents the ROM 202, the RAM 203, the disk 205, and the like illustrated in FIG. 2, for example. A processing result of each unit is stored in a register of the CPU 201, or a cache memory of the CPU 201, or the like.

The management apparatus 102 includes a storage unit including an address management table 421, a maintenance location information management table 422, and a management information table 423. The address management table 421, the maintenance location information management table 422, and the management information table 423 are stored in a storage device, such as the disk 205.

The address management table 421 is a table that stores mail addresses as identification information of the terminal apparatus 103 to be managed. A description will be given of an example of the storage contents of the address management table 421 in FIG. 5.

The maintenance location information management table 422 is a table that stores positional information corresponding to each location of a plurality of locations to which maintenance persons who maintain the management target apparatus 101 belongs. A description will be given of an example of the storage contents of the maintenance location information management table 422 in FIG. 6.

The management information table 423 is a table that stores management information. A description will be given of an example of the storage contents of the management information table 423 in FIG. 7 and FIG. 8.

The acquisition unit 402 obtains positional information of the terminal apparatus 103, which is the own apparatus. As an example of obtaining specific positional information, the method explained in FIG. 1 is given, for example. It is assumed that the management target apparatus 101 and the terminal apparatus 103 are packed in the same box. At this time, if the acquisition unit 402 detects that the box has been unpacked, the acquisition unit 402 may obtain positional information of the terminal apparatus 103. For a method of detecting unpacking, a method described in the patent document is provided, for example. For the timing of obtaining positional information, for example, when an on-site worker presses a power button of the terminal apparatus 103, the acquisition unit 402 may obtain positional information of the terminal apparatus 103.

The transmission unit 403 transmits the identification information of the management target apparatus 101, and the positional information of the terminal apparatus 103 in association with each other to the management apparatus 102.

The reception unit 412 receives the identification information of the management target apparatus 101, and the positional information of the terminal apparatus 103 from the terminal apparatus 103.

The reception unit 412 may receive the identification information of the management target apparatus 101, the positional information of the terminal apparatus 103, and the identification information of the terminal apparatus 103 from the terminal apparatus 103.

The identification unit 413 refers to the maintenance location information management table 422, and identifies any one of the maintenance locations corresponding to the positional information of the terminal apparatus 103 received by the reception unit 412 out of a plurality of maintenance locations. For example, the identification unit 413 identifies a maintenance location that is the nearest from the coordinate position indicated by the positional information of the terminal apparatus 103 out of the plurality of maintenance locations.

The creation unit 414 creates management information of the management target apparatus 101, which includes information identifying an installation site of the management target apparatus 101 identified from the identification information received by the reception unit 412 based on the positional information received by the reception unit 412.

The creation unit 414 may create management information of the management target apparatus 101 which includes the information identifying an installation site of the management target apparatus 101, and the positional information of the maintenance location identified by the identification unit 413.

If the identification information of the terminal apparatus 103 received by the reception unit 412 matches the stored identification information of the terminal apparatus 103 to be managed, the creation unit 414 may create management information of the management target apparatus 101 based on the positional information received by the reception unit 412.

Figure 5:
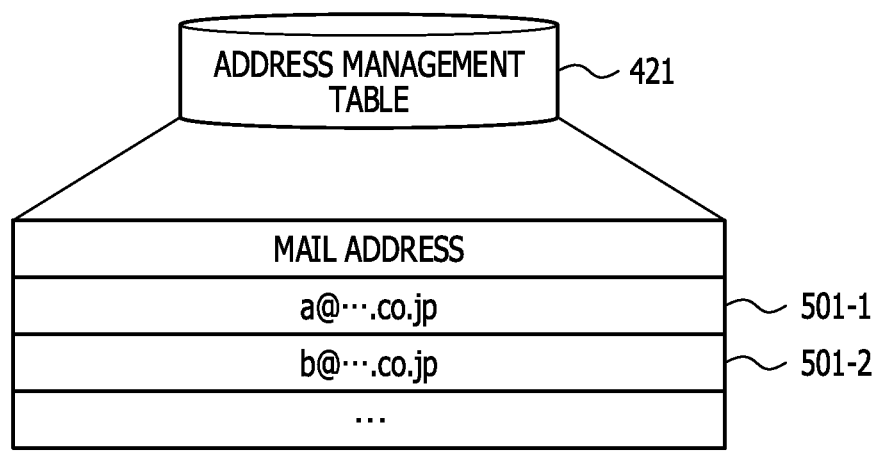
FIG. 5 is an explanatory diagram illustrating an example of storage contents of an address management table.

FIG. 5 is an explanatory diagram illustrating an example of storage contents of the address management table 421. The address management table 421 is a table that stores mail addresses given to the terminal apparatus 103 as identification information of the terminal apparatus 103. The address management table 421 illustrated in FIG. 5 includes records 501-1 and 501-2.

The address management table 421 includes a mail address field. The mail address field stores a mail address given to the terminal apparatus 103. For example, the record 501-1 indicates that a mail address given to a certain terminal apparatus 103 is "a@ . . . co.jp".

Figure 6:
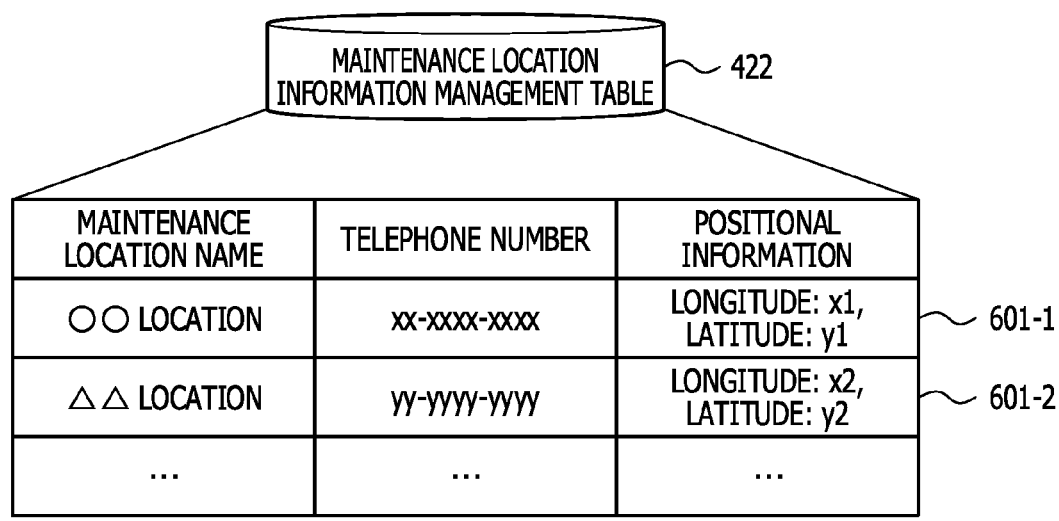
FIG. 6 is an explanatory diagram illustrating an example of storage contents of a maintenance location information management table.

FIG. 6 is an explanatory diagram illustrating an example of storage contents of the maintenance location information management table 422. The maintenance location information management table 422 is a table that stores information on the maintenance location. The maintenance location information management table 422 illustrated in FIG. 6 includes a record 601-1, and a record 601-2.

The maintenance location information management table 422 includes fields of a maintenance location name, a telephone number, and positional information. A name of a maintenance location is stored in the maintenance location name field. A telephone number of the maintenance location is stored in the telephone number field. The longitude and the latitude of a maintenance location is stored in the positional information field as position coordinates of the maintenance location.

For example, the record 601-1 indicates that the telephone number of the maintenance location name "OO location" is "xx-xxxx-xxxx", and the position coordinates of the maintenance location are "longitude: x1, latitude: y1".

Figure 7:
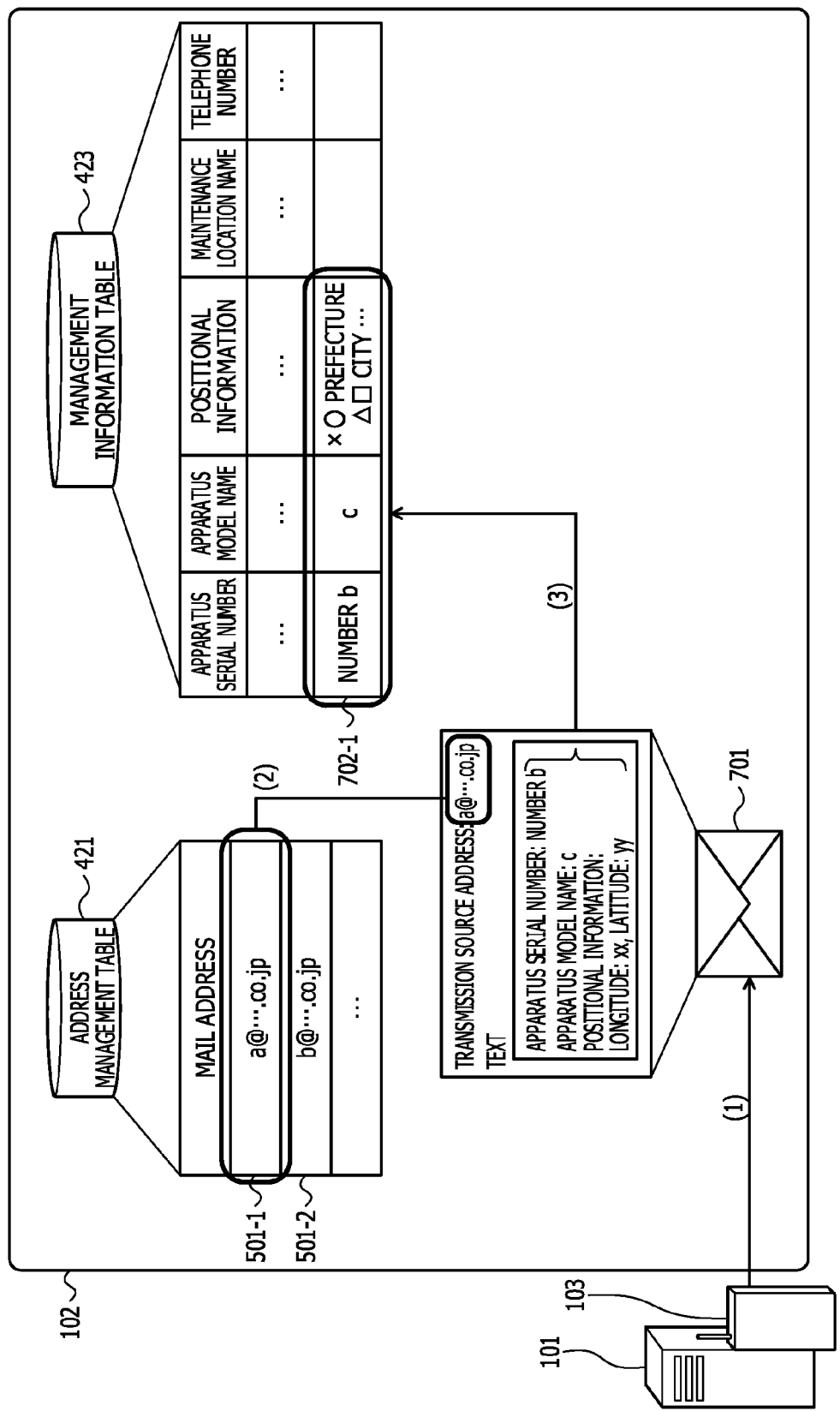
FIG. 7 is an explanatory diagram (1 of 2) illustrating an example of management information creation.

FIG. 7 is an explanatory diagram (1 of 2) illustrating an example of management information creation. When the terminal apparatus 103 detects that the box has been unpacked, as the processing of (1) in FIG. 7, the terminal apparatus 103 obtains positional information, and transmits a mail 701 including the positional information to the management apparatus 102. The management apparatus 102 receives the mail 701 from the terminal apparatus 103. The mail 701 illustrated in FIG. 7 has a transmission source address of "a@ . . . co.jp", and a text having contents stating that the apparatus serial number of the management target apparatus is "number b", the apparatus model name is "c", and the positional information is "longitude: xx, and latitude: yy".

The management apparatus 102 obtains a transmission source address from the mail 701 as the processing of (2) in FIG. 7. Then, the management apparatus 102 determines whether the obtained mail address is recorded in the address management table 421 or not. In the example in FIG. 7, the obtained mail address is recorded in the address management table 421, thus the management apparatus 102 creates apparatus information as the processing of (3) in FIG. 7, and stores the apparatus information into the management information table 423.

Here, the management information table 423 is a table that stores management information. The management information table 423 includes fields, such as an apparatus serial number, an apparatus model name, a positional information, a maintenance location name, and a telephone number. The management information table 423 may include a remarks field in which a user of the management apparatus 102 is allowed to freely edit.

The apparatus serial number field contains an apparatus serial number to be managed. The apparatus model name field contains an apparatus model name to be managed. The positional information field contains positional information where the apparatus to be managed is installed. Here, the positional information field may contain the latitude and the longitude values of the position where the apparatus to be managed is installed, or may contain a character string that has been converted from the latitude and the longitude, and that indicates the address where the apparatus to be managed is installed in order for the user of the management target apparatus 101 to easily understand. The maintenance location name field contains a maintenance location name in charge of maintaining the apparatus to be managed. The telephone number field contains the telephone number of a maintenance location name of the apparatus to be managed.

Specifically, as the processing of (3) in FIG. 7, the management apparatus 102 obtains an apparatus serial number, an apparatus model name, and positional information from the mail 701. Then, the management apparatus 102 searches the management information table 423 for a record that matches the obtained apparatus serial number and the apparatus model name. In the example in FIG. 7, it is assumed that a record has not been detected that matches the obtained apparatus serial number and the apparatus model name, and thus the management apparatus 102 adds a record 702-1 having the obtained apparatus serial number, the apparatus model name, and the positional information to the management information table 423. For the positional information, the management apparatus 102 stores "XO prefecture and Δ☐ city . . . ", which has been converted from the positional information "longitude: xx, and latitude: yy", into the positional information field. A description will be given of recording the maintenance location field and the telephone number field of the record 702-1 with reference to FIG. 8.

Figure 8:
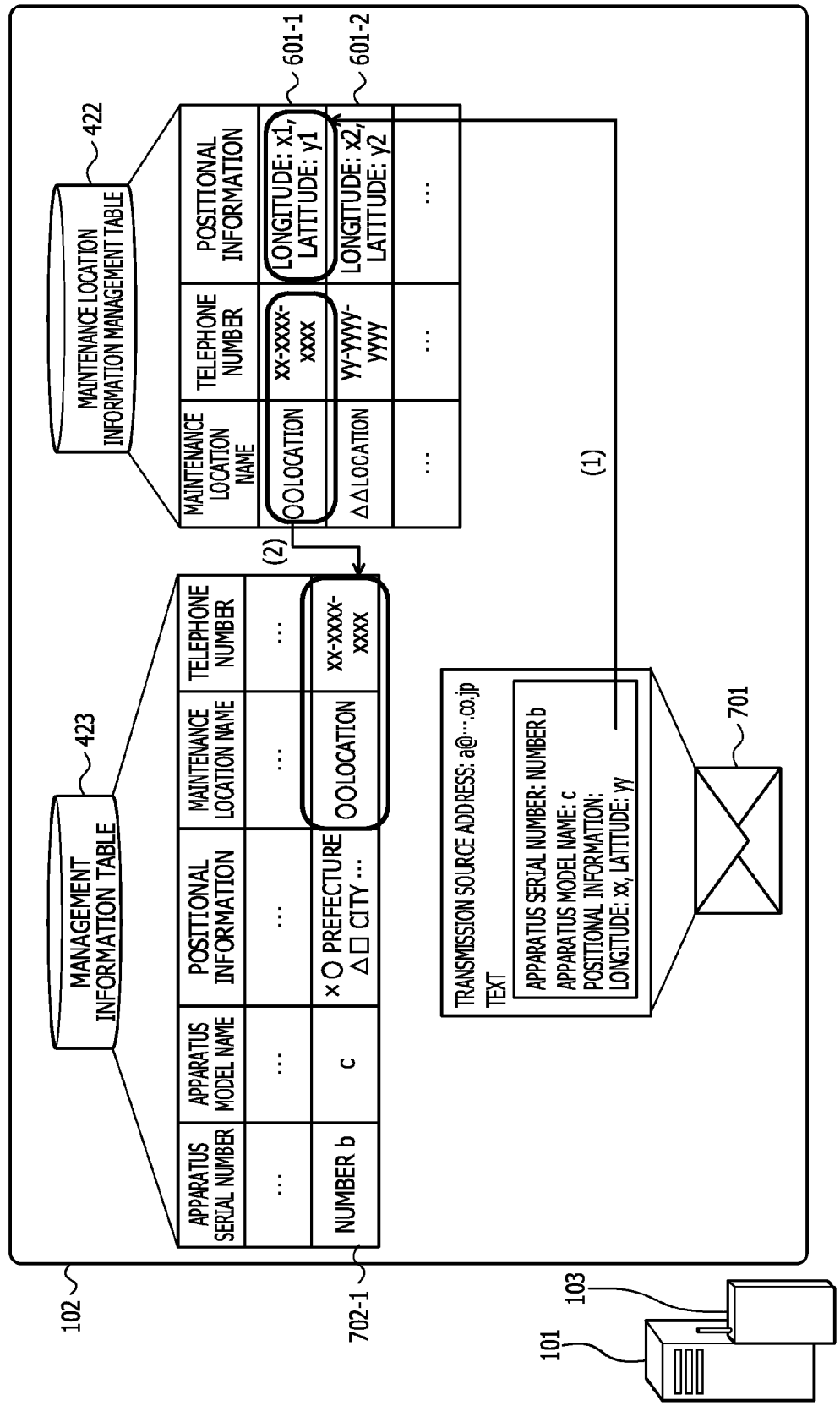
FIG. 8 is an explanatory diagram (2 of 2) illustrating an example of management information creation.

FIG. 8 is an explanatory diagram (2 of 2) illustrating an example of management information creation. After the processing of (3) illustrated in FIG. 7, the management apparatus 102 searches the maintenance location information management table 422 for a neighboring maintenance location using the positional information of the mail 701 as the processing of (1) in FIG. 8. In the example in FIG. 8, the management apparatus 102 detects a record 601-1 in the vicinity of "longitude: xx, and latitude: yy". Then, the management apparatus 102 stores "OO location" and "xx-xxxx-xxxx" of the detected record 601-1 into the maintenance location name field and the telephone number field of the record 702-1 as the processing of (2) in FIG. 8.

Next, a description will be given of a flowchart of the processing executed by each apparatus of the management system 100 using FIG. 9 to FIG. 12.

Figure 9:
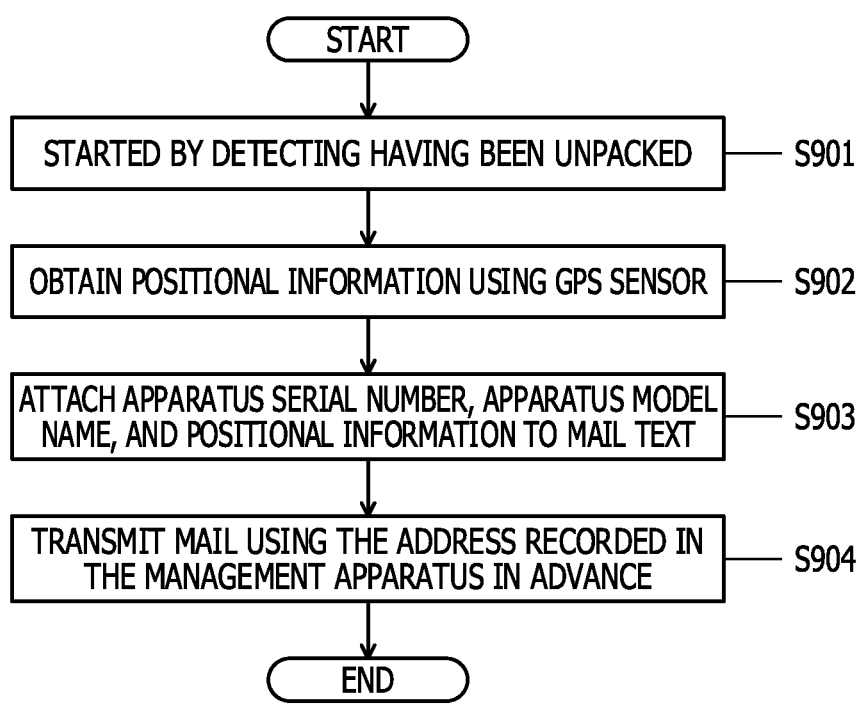
FIG. 9 is a flowchart illustrating an example of a positional information transmission processing procedure.

FIG. 9 is a flowchart illustrating an example of a positional information transmission processing procedure. The positional information transmission processing is processing for transmitting positional information to the management apparatus 102.

The terminal apparatus 103 detects unpacking and is started (S901). Next, the terminal apparatus 103 obtains positional information using the GPS sensor 307 (S902). Then, the terminal apparatus 103 adds an apparatus serial number, an apparatus model name, and positional information to the mail text (S903). Next, the terminal apparatus 103 transmits the mail using the address recorded in the management apparatus 102 in advance (S904). After completion of the processing in S904, the terminal apparatus 103 terminates the positional information transmission processing. By executing the positional information transmission processing, it is possible for the terminal apparatus 103 to transmit the positional information to the management apparatus 102.

The positional information transmission processing is performed each time the installation site of the management target apparatus 101 is changed, that is to say, each time the management target apparatus 101 is moved. When the management target apparatus 101 is moved, for example, an on-site worker at the movement source packs the terminal apparatus 103 and the management target apparatus 101 into the packing box again. Then, when an on-site worker at the movement destination unpacks the box that contains the terminal apparatus 103 and the management target apparatus 101, the terminal apparatus 103 executes the positional information transmission processing once again.

Figure 10:
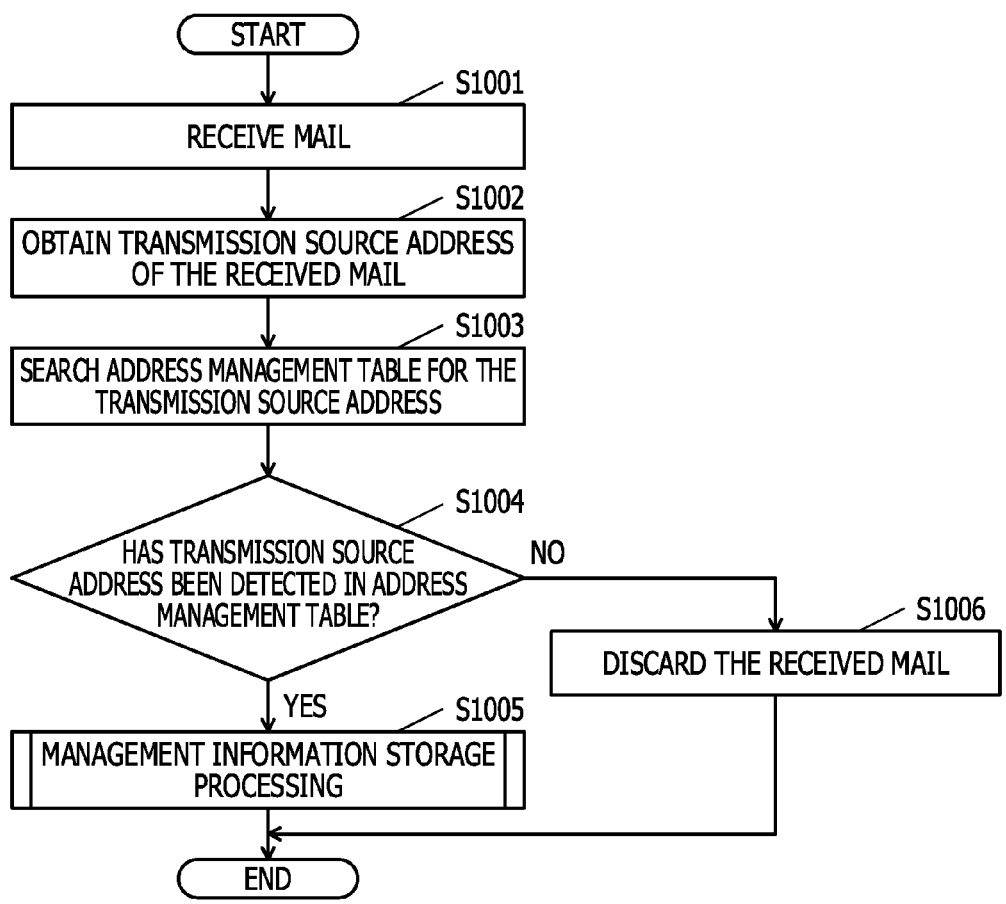
FIG. 10 is a flowchart illustrating an example of a management information creation processing procedure.

FIG. 10 is a flowchart illustrating an example of a management information creation processing procedure. The management information creation processing is processing for creating management information at the time of receiving a mail.

The management apparatus 102 receives the mail (S1001). Next, the management apparatus 102 obtains the transmission source address of the received mail (S1002). Then, the management apparatus 102 searches the address management table 421 for the transmission source address (S1003). Next, the management apparatus 102 determines whether the transmission source address has been detected in the address management table 421 (S1004). If determined that the transmission source address has been detected in the address management table 421 (S1004: Yes), the management apparatus 102 executes management information storage processing (S1005). A description will be given of the details of the management information storage processing with reference to FIG. 11.

On the other hand, if determined that the transmission source address has not been detected from the address management table 421 (S1004: No), the management apparatus 102 discards the received mail (S1006). After completion of the processing in S1005 or S1006, the management apparatus 102 terminates the management information creation processing. By performing the management information creation processing, it is possible for the management apparatus 102 to create management information.

Figure 11:
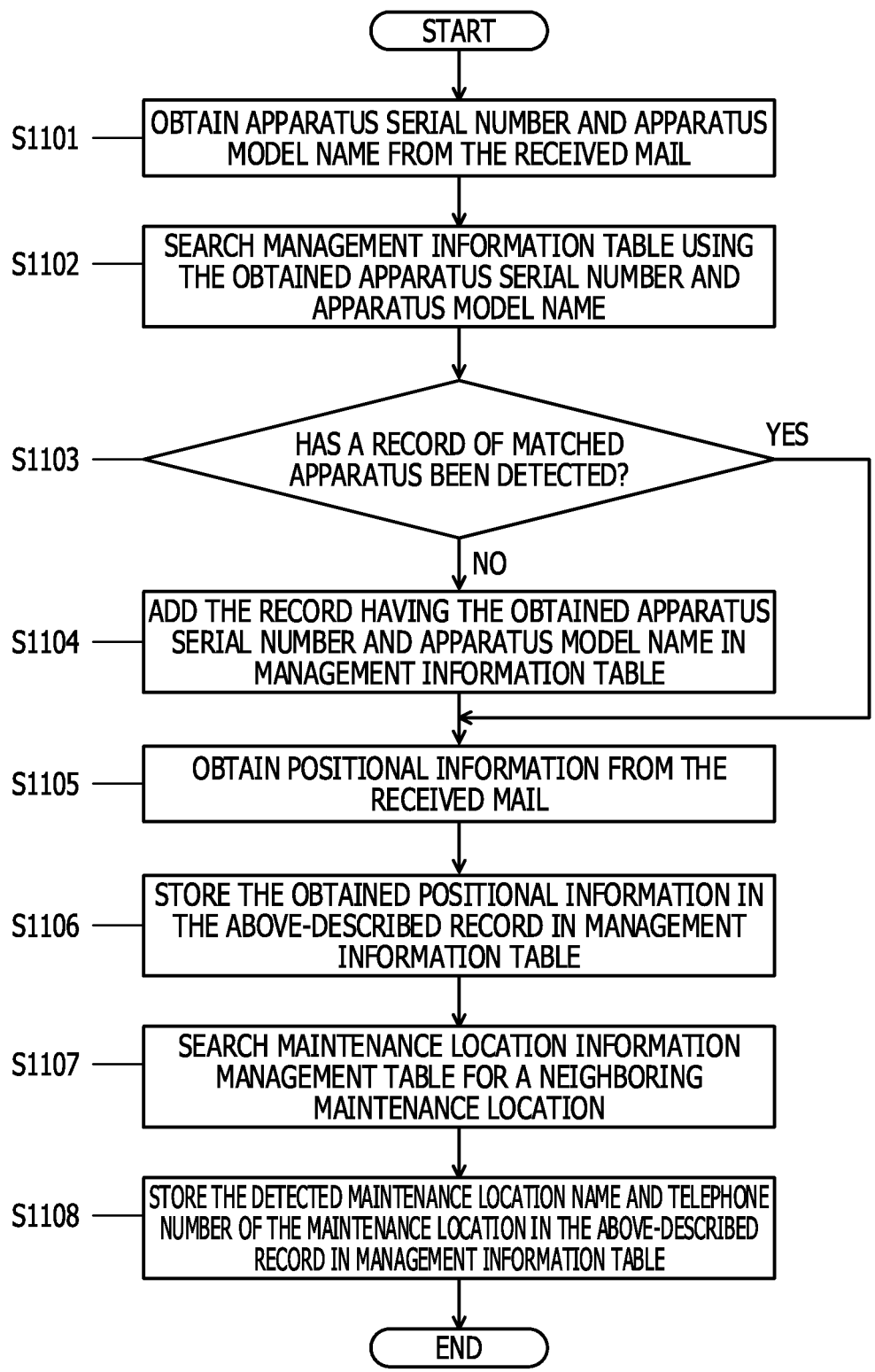
FIG. 11 is a flowchart illustrating an example of a management information storage processing procedure.

FIG. 11 is a flowchart illustrating an example of a management information storage processing procedure. The management information storage processing is processing for storing management information.

The management apparatus 102 obtains an apparatus serial number and an apparatus model name from the received mail (S1101). Next, the management apparatus 102 searches the management information table 423 using the obtained apparatus serial number and apparatus model name (S1102). Then, the management apparatus 102 determines whether a record of the matched apparatus has been detected or not (S1103). If determined that a record of the matched apparatus has not been detected (S1103: No), the management apparatus 102 adds a record having the obtained apparatus serial number and apparatus model name to the management information table 423 (S1104).

On the other hand, if a record of the matched apparatus has been detected (S1103: Yes), the management apparatus 102 has already been recorded in the management information table 423, and thus processing on the management information table 423 is not performed in particular. The case of Yes in S1103 is a case where the management target apparatus 101 was moved.

After completion of the processing in S1104, or when Yes in S1103, the management apparatus 102 obtains positional information from the received mail (S1105). Next, the management apparatus 102 stores the obtained positional information into the above-described record of the management information table 423 (S1106). Then, the management apparatus 102 searches the maintenance location information management table 422 for a neighboring maintenance location using the obtained positional information (S1107). Next, the management apparatus 102 stores the detected maintenance location name and the telephone number of the maintenance location into the above-described record of the management information table (S1108). After completion of the processing in S1108, the management apparatus 102 terminates the management information storage processing. By executing the management information storage processing, it is possible for the management apparatus 102 to store the management information.

Figure 12:
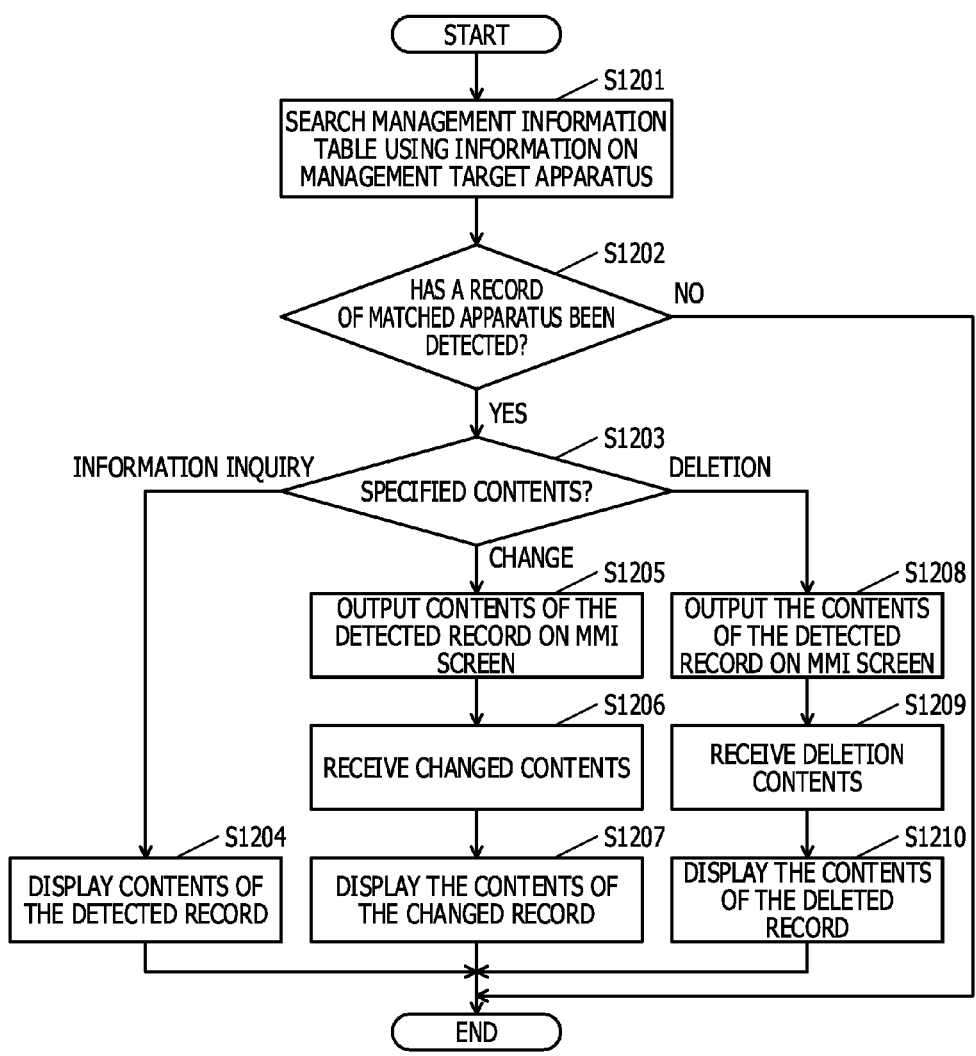
FIG. 12 is a flowchart illustrating an example of a management information inquiry and edit processing procedure.

FIG. 12 is a flowchart illustrating an example of a management information inquiry and edit processing procedure. The management information inquiry and edit processing is processing for inquiring and editing management information.

The management apparatus 102 searches the management information table 423 using information on the management target apparatus (S1201). Specifically, the management apparatus 102 searches the management information table 423 using a keyword on the management target apparatus, such as an apparatus serial number, an apparatus model name, or the like input by the user of the management apparatus 102.

Next, the management apparatus 102 determines whether a record of the matched apparatus has been detected or not (S1202). If determined that a record of the matched apparatus has been detected (S1202: Yes), the management apparatus 102 determines whether the instruction contents match any one of the contents indicated in the following (S1203). The contents indicated in the following are information inquiry, change, and deletion. If the instruction contents is information inquiry (S1203: information inquiry), the management apparatus 102 displays the contents of the detected record (S1204).

If the instruction contents is change (S1203: change), the management apparatus 102 outputs the contents of the detected record on the MMI screen (S1205). Next, the management apparatus 102 receives the change contents (S1206). As an example of the processing in S1206, the management apparatus 102 receives the contents that have been changed from the contents stored in the remarks field. Then, the management apparatus 102 displays the contents of the changed record (S1207). As an example of the processing in S1207, the management apparatus 102 displays the contents of each field of the detected record including the contents after the change of the remarks field.

If the instruction contents is deletion (S1203: deletion), the management apparatus 102 outputs the contents of the detected record on the MMI screen (S1208). Next, the management apparatus 102 receives the deletion contents (S1209). As an example of the processing in S1209, the management apparatus 102 receives the contents in which the contents of the remarks field have been deleted. Then, the management apparatus 102 displays the contents of the deleted record (S1210). As an example of the processing in S1210, the management apparatus 102 displays the contents of each field of the detected record including the remarks field having nothing stored.

After completion of any one of the processing in S1204, S1207, and S1210, or if determined that a record of the matched apparatus has not been detected (S1202: No), the management apparatus 102 terminates the management information inquiry and edit processing. By executing the management information inquiry and edit processing, it is possible for the management apparatus 102 to inquire the management information, or to edit the management information.

As described above, the management apparatus 102 creates information that identifies an installation site of the management target apparatus 101 from positional information of the terminal apparatus that has been received from the terminal apparatus packed together with the management target apparatus 101 at the time of unpacking. Thereby, it is possible to for the management apparatus 102 to create management information of the management target apparatus 101 without inputting of an installation site by an on-site worker, and thus the management information of the management target apparatus 101, which includes information for identifying the installation site, becomes correct. Accordingly, it is possible for the management system 100 to reduce the maintenance cost of the management target apparatus 101.

The management system 100 creates management information of the management target apparatus 101 without input of the installation site by an on-site worker, and thus it is possible to reduce the input load of the on-site worker. Also, it is possible for the management system 100 not to perform checking of an input error or input omission on the input screen, because of not involving input by an on-site worker. Accordingly, it is possible to suppress the load imposed on the management system 100.

The management apparatus 102 ought to create management information of the management target apparatus 101, which includes any one of the maintenance locations in accordance with the positional information of the terminal apparatus 103, out of a plurality of maintenance locations. Thereby, it is possible for the management apparatus 102 to create information of a suitable maintenance location for maintaining the management target apparatus 101 as management information of the management target apparatus 101. Accordingly, it is possible to reduce a temporal cost and an economical cost for the maintenance management target apparatus 101.

The management apparatus 102 may identify the maintenance location depending on the type of the management target apparatus 101, and the positional information of the terminal apparatus 103 from a plurality of maintenance locations. For example, the management apparatus 102 associates a mail address with a type of the management target apparatus 101 in the address management table 421. Then, the management apparatus 102 identifies the type of the management target apparatus 101 from the received transmission source mail address, and identifies the maintenance location out of a plurality of maintenance locations.

For example, if the management target apparatus 101 is a large-sized machine, it is assumed that a maintenance person who maintains the management target apparatus 101 packs tools for use in maintenance, replacement parts, and the like in a car, and visits by car the location where the management target apparatus 101 is installed. At this time, the management apparatus 102 identifies that the type of the management target apparatus 101 is a large-sized machine, identifies several maintenance locations near the position indicated by the positional information of the terminal apparatus 103 out of a plurality of maintenance locations, and then identifies the location that is allowed to be reached fastest by car.

If the management target apparatus 101 is a small-sized machine, it is assumed that a maintenance person who maintains the management target apparatus 101 packs tools for use in maintenance, replacement parts, and the like, in a tool box, and visits, by train or on foot, the location where the management target apparatus 101 is installed. At this time, the management apparatus 102 identifies that the type of the management target apparatus 101 is a small-sized machine, identifies several maintenance locations near the position indicated by the positional information of the terminal apparatus 103 out of a plurality of maintenance locations. Then, the management apparatus 102 identifies the location that is allowed to be reached fastest by train or on foot, or at the least transportation cost out of the several identified maintenance locations. In this manner, the management apparatus 102 identifies the maintenance location in accordance with the type of the management target apparatus 101 so that it is possible to reduce temporal cost and economical cost for the maintenance of the management target apparatus 101 compared with the case of not considering the type of the management target apparatus 101.

If the identification information of the terminal apparatus 103, which has been received from the terminal apparatus 103, matches the identification information of the terminal apparatus 103, which has been stored in the address management table 421, the management apparatus 102 may create management information of the management target apparatus 101. Thereby, the management apparatus 102 does not store the identification information of the management target apparatus 101 that has not to be managed in the address management table 421, and thus it is possible to reduce management cost. It is possible for the management apparatus 102 to suppress recording by an irrelevant mail in the management information table 423, and thus it is possible to maintain security.

Here, in the present embodiment, a mail address is used for identification information of the terminal apparatus 103. However, information that is allowed to maintain more security may be used. For example, the management system 100 may use a hash value obtained by inputting identification information of the terminal apparatus 103 into a hash function as the identification information of the terminal apparatus 103. For example, the terminal apparatus 103 adds a hash value obtained by inputting a transmission source address into a hash function to the text, and mails the text to the management apparatus 102. If a hash value obtained by inputting the transmission source address of the received mail into a hash function matches the hash value in the text of the received mail, the management apparatus 102 that has received the mail creates management information of the management target apparatus 101.

Here, in the case of using a hash value obtained by inputting a transmission source address into a hash function as identification information of the terminal apparatus 103, each time the management target apparatus 101 is moved, the hash value of the mail to be transmitted have the same value all the time, and thus a third person might make wrong use. For example, it is assumed that a third person who has wiretapped a mail transmits a mail including a hash value of the text of the wiretapped mail, and fake positional information to the management apparatus 102 using the transmission source address of the wiretapped mail. In this case, the management apparatus 102 creates management information of the management target apparatus 101 based on the mail that was transmitted by the third person.

Thus, the management system 100 may use a hash value obtained by inputting a character string produced by combining the identification information of the terminal apparatus 103, and the number of transmission times of the mail into a hash function as the identification information of the terminal apparatus 103.

Specifically, the management target apparatus 101 stores the number of receptions for each transmission destination mail address in the address management table 421. Then, the terminal apparatus 103 adds a hash value obtained by inputting a character string produced by combining the transmission source address and the number of times of mail transmission into a hash function to the text of the mail, and transmits the mail to the management target apparatus 101.

Here, the number of times of mail transmission may include the number of times for the mail to be transmitted, or may not include that number. If the hash value obtained by inputting the character string produced by combining the transmission source address of the received mail, and the number of receptions into the hash function matches the hash value in the text, the management apparatus 102 that has received the mail creates management information of the management target apparatus 101. Thereby, even if a third person who wiretapped the mail transmits a mail using the hash value of the text of the wiretapped mail, the number of transmissions is different, and thus it is possible for the management apparatus 102 to discard the mail transmitted from the third person.

The terminal apparatus 103 may store identification information of the management target apparatus 101 installed at the same location as the terminal apparatus 103, may associate the identification information of the management target apparatus 101 with the positional information of the obtained terminal apparatus 103, and may transmit the information to the management apparatus 102. Thereby, it is possible for the terminal apparatus 103 to transmit information that is regarded as the positional information of the management target apparatus 101 in place of the management target apparatus 101 that is not allowed to transmit information for the sake of security to the management apparatus 102.

The management target apparatus 101 and the terminal apparatus 103 are packed in the same box, and thus if detected that the box is unpacked, the terminal apparatus 103 may obtain positional information of the terminal apparatus 103. Thereby, it is possible for the terminal apparatus 103 to transmit the identification information of the management target apparatus 101 and the positional information of the terminal apparatus 103 without taking time and effort of an on-site worker. It does not take time and effort of an on-site worker, and thus it is possible for the terminal apparatus 103 to suppress transmission omission of the identification information of the management target apparatus 101, and the positional information of the terminal apparatus 103.

In the management system 100, it is possible to obtain correct management information of the management target apparatus 101, and thus it becomes easy for a maintenance person to visit the location where the management target apparatus 101 is installed. Accordingly, it becomes easy to transmit information, such as a design change of the management target apparatus 101, or the like to an on-site worker. If it is difficult to obtain correct management information of the management target apparatus 101, the manufacturer inquires of a purchaser of the management target apparatus 101 in order to perform maintenance service, or the like, and thereby the maintenance cost is increased. It is possible for the management system 100 according to the present embodiment to obtain correct management information of the management target apparatus 101, and thus to reduce the maintenance cost.

It is possible for the management system 100 to obtain correct management information of the management target apparatus 101, and thus it becomes easy for a maintenance person to visit the location where the management target apparatus 101 is installed. Accordingly, it is possible to easily collect information indicating the operation result of the management target apparatus 101. Thereby, it is possible for a development person of the management target apparatus 101 to improve the quality of the management target apparatus 101 using information indicating the operation result of the management target apparatus 101.

It is possible to achieve the management method described in the present embodiment by executing a program provided in advance on a computer, such as a personal computer, a workstation, or the like. This management program is stored in a computer-readable recording medium, such as a hard disk, a flexible disk, a compact disc-read only memory (CD-ROM), a digital versatile disk (DVD), or the like, and is read by the computer from the recording medium, and then is executed. This management program may be distributed through a network, such as the Internet, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus comprising:
a memory; and
a processor coupled to the memory and configured to:
receive identification information of the management target apparatus and positional information of a mobile apparatus different from the management target apparatus, from the mobile apparatus installed at a same location as a management target apparatus, the management target apparatus and the mobile apparatus being shipped from a common shipping source to the same location, and
generate management information of the management target apparatus including information identifying an installation site of the management target apparatus based on the received identification information and positional information.

2. The management apparatus according to claim 1, wherein the memory is configured to store positional information for each of a plurality of locations,
wherein the processor is configured to:
identify a location corresponding to the received positional information among the plurality of locations by referring to the positional information for each of the plurality of locations, and
generate management information of the management target apparatus including information of the identified location.

3. The management apparatus according to claim 1, wherein the memory is configured to store identification information of the mobile apparatus,
wherein the processor is configured to:
receive the identification information of the management target apparatus, the positional information of the mobile apparatus, and the identification information of the mobile apparatus from the mobile apparatus, and
generate management information of the management target apparatus based on the received positional information of the mobile apparatus, when the received identification information of the mobile apparatus matches the identification information of the mobile apparatus stored in the memory.

4. The management apparatus according to claim 1, wherein the processor is configured to generate information identifying the installation site by converting the received positional information into a character string representing an address.

5. The management apparatus according to claim 1, wherein the processor is configured to
receive the positional information of the mobile apparatus obtained when the processor has detected that a box in which the management target apparatus and the mobile apparatus are stored has been unpacked.

6. The management apparatus according to claim 5, wherein the processor is configured to receive the positional information of the mobile apparatus from the mobile apparatus when power is turned on to the mobile apparatus.

7. The management apparatus according to claim 1, wherein the management target apparatus and the mobile apparatus are stored in a box when the management target apparatus and the mobile apparatus are shipped from the common shipping source.

8. A mobile apparatus comprising:
a memory configured to store identification information of a management target apparatus different from the mobile apparatus, the management target apparatus being installed at a same location as the mobile apparatus, the management target apparatus and the mobile apparatus being shipped from a common shipping source to the same location; and
a processor coupled to the memory and configured to:
obtain positional information of the mobile apparatus, and
transmit the obtained positional information of the mobile apparatus and the identification information of the management target apparatus in association with each other to a management apparatus.

9. The mobile apparatus according to claim 8, further comprising
a global positioning system (GPS) sensor,
wherein the processor is configured to obtain the positional information of the mobile apparatus from the GPS sensor.

10. The mobile apparatus according to claim 8, wherein the processor is configured to obtain the positional information of the mobile apparatus from a base station.

11. The mobile apparatus according to claim 8, wherein the processor is configured to:
add the identification information and the obtained positional information to a mail text, and
transmit mail including the mail text using an address recorded in the management apparatus in advance.

12. The mobile apparatus according to claim 11, wherein the identification information is an apparatus serial number and an apparatus model name of the management target apparatus.

13. A management system comprising:
a management apparatus including a first memory;
a management target apparatus to be managed by the management apparatus; and
a mobile apparatus different from the management target apparatus, the mobile apparatus being installed at a same location as a location where the management target apparatus is installed, and including a second memory storing identification information of the management target apparatus, the management target apparatus and the mobile apparatus being shipped from a common shipping source to the same location,
wherein the mobile apparatus is configured to:
  obtain positional information of the mobile apparatus, and
  transmit the obtained positional information of the mobile apparatus, and the identification information of the management target apparatus in association with each other to the management apparatus,
wherein the management apparatus is configured to:
  receive the identification information of the management target apparatus, and the positional information of the mobile apparatus from the mobile apparatus, and
  generate management information of the management target apparatus including information identifying an installation site of the management target apparatus based on the received identification information and positional information.

14. The management system according to claim 13, wherein the management apparatus is configured to:
  store positional information for each of a plurality of locations,
  identify a location corresponding to the received positional information among the plurality of locations by referring to the positional information for each of the plurality of locations, and
  generate management information of the management target apparatus including information of the identified location.

15. The management system according to claim 13, wherein the management apparatus is configured to:
  store identification information of the mobile apparatus,
  receive the identification information of the management target apparatus, the positional information of the mobile apparatus, and the identification information of the mobile apparatus from the mobile apparatus, and
  generate management information of the management target apparatus based on the received positional information of the mobile apparatus, when the received identification information of the mobile apparatus matches the identification information of the mobile apparatus stored in the memory.

* * * * *